March 22, 1927.

V. C. CANTER 1,622,024

APPARATUS FOR COOLING AND CONDENSATION

Filed May 2, 1924

INVENTOR
VERNON C CANTER
BY
ATTORNEY

Patented Mar. 22, 1927.

1,622,024

UNITED STATES PATENT OFFICE.

VERNON C. CANTER, OF CHARLESTON, WEST VIRGINIA, ASSIGNOR TO GASOLINE RECOVERY CORPORATION, A CORPORATION OF DELAWARE.

APPARATUS FOR COOLING AND CONDENSATION.

Application filed May 2, 1924. Serial No. 710,667.

This invention relates to an improved process or method for the cooling and condensation of vapors and the further cooling of liquids produced by such condensation. It relates further to a cooling and condensation process which is assisted by evaporation of the cooling medium. It also relates to an apparatus especially adapted to the carrying out of the said process.

At the present time there are in common use three general types of condensers adapted to the work of both cooling and condensing. First and simplest, the concurrent flow drip type. This type consists of closed tubes so arranged that the vapors to be cooled enter at the top and flow with a more or less downward slope to the bottom of the condenser while water is dripping or being sprayed over the outside of the condenser. This type is open to the atmosphere but has the disadvantage that the warmer vapors enter the top and flow within the tubes in the same direction that the cooling water is flowing over the outside of the tubes. Therefore, the coldest water or cooling fluid touches the warmest vapors and necessarily the warmest water or cooling fluid is only available for heat exchange with the coolest vapors. The second type of cooler is the immersed type cooler. The immersed type cooler operates by having the enclosed condenser tubes immersed in the cooling liquid. The vapors to be cooled enter at the top and flow downwardly through the condenser while the cooler water enters at the bottom and as it is heated gradually rises. This is counter-current but it has the disadvantage that it is not exposed to the atmosphere to any great extent and loses the effect of atmospheric cooling through evaporation. The third type of cooler is a modification of the immersed type where the vapors to be cooled are carried in a casing surrounded by another casing, the cooling element being placed between the two casings or vice versa. This has the advantage of being counter-current but the disadvantage of not being subject to atmospheric cooling through evaporation.

Now the process and apparatus hereinafter described, is so arranged as to combine the good qualities present in each of these three condensers while at the same time the apparatus is very economical in construction, that is to say, I combine the principle of counter-current flow with an open type condenser where atmospheric evaporation may take place, and the process and apparatus provides a system wherein the vapors after being condensed are further cooled before leaving the apparatus. It has the further advantage in that it is easy to erect, is less costly since less square feet of transfer surface are required to carry out the same work, is more easily cleaned and repaired and can, therefore, be kept in such a condition that there is better heat transfer through the coils.

The arrangement and operation of this novel type of condenser is explained in detail in connection with the accompanying drawings in which.

Figure 2:
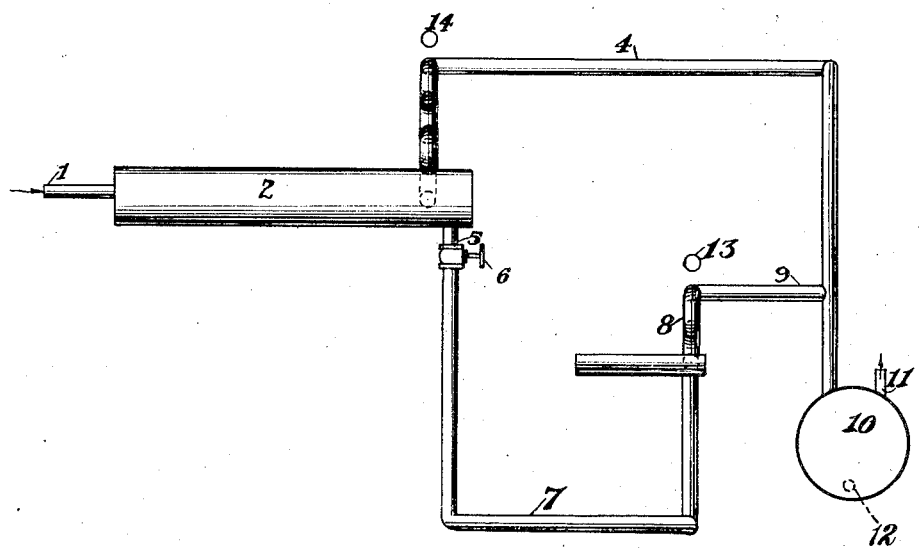
Fig. 2 shows an end view of the same.
Figure 1:
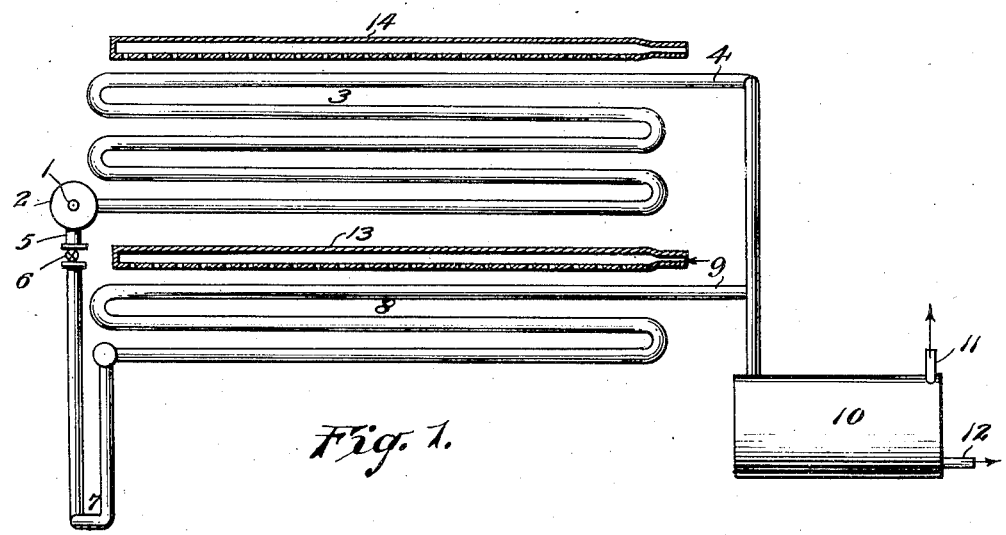
Fig. 1 shows the side elevation of a single unit of the apparatus.

In Fig. 1, 1 is the vapor inlet into the tank 2, which is used as a header for the coils. The vapors enter at the bottom of the coil 3 and any uncondensed vapors and entrained condensate pass through the coil and out of the pipe 4 into the receiving separator 10. The main portion of the condensate from coil 3 drains back into the coil header 2, then flows through the outlet line 5 and the valve 6 into the U line 7 into the condensate cooling coils 8 where it is cooled on its way upward through the coils, then empties into the receiving separator 10 through the discharge line 9. Any vapors which fail to condense are drawn off through the outlet vapor line 11 and the condensate is drawn off through the drain line 12. Water from the perforated pipes 13 and 14 is allowed to drip over the coils to cool the vapors and condensate. The water may be sprayed or showered over the coils instead of using the perforated pipes 13 and 14, if so desired. Fig. 2 shows an end view of the apparatus with the same figures applying throughout. It will be noted that the condensate cooling coil 8 is located to the side of the vapor coil 3 so that the hot water from the upper coil does not drop over the condensate cooling coil 8 which has its own separate water distributing pipe 13. The two coils are so located that the flow of condensate from the upper coil 3 to the lower coil 8 is actuated entirely by gravity. It will be noted that while the upper coil handles both condensate and vapor, the lower coil 8 is used for cooling the condensate alone. This condensate also flows upward due to the accumulation of liquid in the entering leg of the U-pipe 7 through the coil counter-current to the water flow. Vapor is prevented from entering the lower coil 8 by means of the liquid condensate seal in the U pipe 7. For simplicity in the explanation only one unit of the condenser coil has been shown but it is evident that as many coils as are desired may be worked in parallel entering and leaving a common header or in series provided relative positions as regards arrangement for gravity flow are maintained. In practice the condensate cooling coils are designed much smaller than the vapor coils. The valve 6 may be used to control the flow of the liquid through the lower coil if the flow of vapors or liquid into the header 2 is more or less periodical. Practice has demonstrated in the particular field of condensing gasoline vapors from vapor mixtures that when vapors entering a coil arranged in this manner at a temperature of 150° F. with cooling water at 60° F. pouring over the coil the condensed liquid emerges from the coil at a temperature within 4 to 6° F. of the initial temperature of the water, that is, gasoline may leave the condenser and flow into the condenser tank 10 at a temperature of 64° to 66° F. while the water as it drips from the bottom of the upper coil may be heated as high as 75° to 85° F. This is remarkable, as a comparison with the straight drip concurrent flow type explained before shows. Having the same number of cubic feet surface, the same amount of vapors, and the same amount of cooling water, the gasoline vapors will leave that type of condenser at 80° to 90° F. temperature and the water will drip from the condenser at slightly lower temperature.

The apparatus may be built of any material desired so long as that material will retain the vapors and condensate and permit a satisfactory heat exchange. Metals have the advantage of high heat exchange and economy of construction.

What I claim and desire to secure by Letters Patent is:—

1. A condensing apparatus including upper and lower cooling coils, an inlet header connected to the lower part of the upper coil, receiving means, an outlet pipe extending from the upper part of the upper coil, conveying means connecting said pipe to the receiving means, said receiving means being located relatively lower than either coil, an inlet pipe extending from the header to the bottom of the lower coil and having a liquid trap section extending considerably lower than the bottom of the lower coil, an outlet pipe extending from the top of the lower coil into the conveying means, means for causing a liquid cooling agent to be sprayed over the upper coil, and other means for causing a liquid cooling agent to be sprayed over the lower coil.

2. A condensing apparatus including upper and lower coils, a header connected to the lower end of the upper coil, a receiver, an outlet conduit extending from the top of the upper coil to the receiver, a valved conduit extending from the header and having a U-shaped portion forming a trap, means connecting said trap to the lower end of the lower coil, means connecting the upper end of the lower coil to the receiver, said coils being exposed to the atmosphere, and means for showering a liquid cooling agent over the coils, said coils being relatively spaced to prevent the liquid cooling agent from the upper coil flowing over the lower coil.

3. In combination, a header having an inlet, an upper coil having its lower end connected to the header, a receiver connected to the upper end of said coil, an outlet pipe connected to the header and provided with a trap section, a lower coil arranged to one side of the upper coil, below the latter and having its lower end connected to the trap section, and means connecting the upper end of the lower coil to the receiver.

In testimony whereof I affix my signature.

VERNON C. CANTER.